(12) United States Patent
Baxter (10) Patent No.: US 8,019,699 B2
(45) Date of Patent: Sep. 13, 2011

(54) MACHINE LEARNING SYSTEM (75) Inventor: Jonathan Baxter, Herndon, VA (US)

(73) Assignee: Panscient, Inc., Reston, VA (US)

( * ) Notice: Subject to any disclaimer, the term of this patent is extended or adjusted under 35 U.S.C. 154(b) by 814 days.

(21) Appl. No.: 11/663,964

(22) PCT Filed: Sep. 29, 2005

(86) PCT No.: PCT/AU2005/001488
§ 371 (c)(1),
(2), (4) Date: Apr. 21, 2008

(87) PCT Pub. No.: WO2006/034544
PCT Pub. Date: Apr. 6, 2006

(65) Prior Publication Data
US 2008/0281764 A1 Nov. 13, 2008

(30) Foreign Application Priority Data
Sep. 29, 2004 (AU) .................................. 2004905602

(51) Int. Cl.
*G06F 15/18* (2006.01)
(52) U.S. Cl. .......................................................... 706/12
(58) Field of Classification Search .................. 706/12
See application file for complete search history.

(56) References Cited

U.S. PATENT DOCUMENTS 6,507,829 B1 * 1/2003 Richards et al. ................ 706/45
6,714,925 B1 * 3/2004 Barnhill et al. ................ 706/48

OTHER PUBLICATIONS

D.D. Lewis et al., "A Sequential Algortihm for Training Text Classifiers," Proc. 17th ACM Int'l Conf. on Research and Development in Information Retrieval, pp. 3-12, 1994.
V.R. Shanks et al., "Index Construction for Linear Categorisation," Proc. 12th Int'l Conf. on Information and Knowledge Management, pp. 334-341, 2003.
S.J. Cunningham et al., "Applications of Machine Learning in Information Retrieval," Ann. Review of Information Science and Technology, vol. 34, pp. 341-384, 1999.

* cited by examiner

*Primary Examiner* — Jeffrey A Gaffin
*Assistant Examiner* — Vincent Gonzales
(74) *Attorney, Agent, or Firm* — Robert Platt Bell (57) ABSTRACT

A method for training a classifier to classify elements of a data set according to a characteristic is described. The data set includes N elements with the elements each characterized by at least one feature. The method includes the steps of forming a first labeled subset of elements from the data set with the elements of the first labeled subset each labeled according to whether the element includes the characteristic, training an algorithmic classifier to classify for the characteristic according to the first labeled subset thereby determining which at least one feature is relevant to classifying for the characteristic; and then querying with the classifier an inverted index, with this inverted index formed over the at least one feature and generated from the data set, thereby generating a ranked set of elements from the data set.

18 Claims, 6 Drawing Sheets

MACHINE LEARNING SYSTEM

CROSS-REFERENCE TO RELATED APPLICATIONS

This is a national stage application under 35 USC 371 of International Application No. PCT/AU2005/001488, filed Sep. 29, 2005, which claims priority from Australian Patent Application No. 2004-905602, filed Sep. 29, 2004, the entire disclosures of which are incorporated herein by reference.

BACKGROUND OF THE INVENTION

There are a large number of computational problems that are too complex for a human to explicitly determine and code a solution. Examples of such problems include machine recognition of human facial characteristics, speech recognition, the classification of a corpus of documents into a taxonomy and the extraction of information from documents. In an attempt to solve these problems a class of algorithms has been developed that effectively train a computer to perform a specific task by providing example data. This class of algorithms comes under the broad heading of Machine Learning as the computer running such algorithms is attempting to "learn" how to solve a posed problem by learning from example solutions.

Thus Machine Learning algorithms typically require a collection of human-labeled training examples as input, from which a solution is inferred. By way of an illustrative example, if the posed problem is to recognize the characteristic that a given web page is a corporate "about-us" page from the set of all published web pages on the Internet, then the machine learning algorithm would be provided with labeled "positive" examples of "about-us" pages, and further negative examples of other different kinds of web pages not having this characteristic. The algorithm would then infer the features of the positive class relevant to this characteristic (i.e. "about-us" pages) necessary to distinguish it automatically from the negative class (i.e not "about-us" pages). Once trained sufficiently, the algorithm can then classify new web pages automatically. Obviously, this approach can be generalized and applied to multi-class problems where there are multiple positive classes. Following on from the "about-us" example described above, this might involve further classifying web pages into several additional categories such as pages having the characteristic of being a "contact" page or a "product" page.

For the Machine Learning algorithm to perform well on new examples, the training data must contain sufficiently representative examples of both the positive and negative class (or classes for a multi-class problem). This requirement leads to one serious disadvantage of these types of algorithms in the case where the positive class is under-represented in the natural distribution over the data of interest. Turning once again to the "about us" web page example, pages of this nature comprise only a small fraction of all web-pages. Thus one has to label a large quantity of web pages to obtain enough representative examples of the positive class. As the labeling procedure is performed by humans, it can be a labour intensive and hence expensive process.

One attempt to address this disadvantage is to modify the Machine Learning algorithm to actively select examples for a human to subsequently label thereby reducing the amount of human labeling required to train the algorithm. These refined Machine Learning algorithms are termed Active Learning algorithms and all share the feature of attempting to reduce the overall labeling burden by actively selecting the most "informative" examples from the total data set for the human to label, rather than having the human label large numbers of relatively uninformative negative examples. Thus the Active Learning algorithm must in some sense characterize the maximally informative unlabeled examples from the total data set given the labeled examples seen thus far and the class of classifiers available to the learning algorithm.

However, Active Learning algorithms of this type do not address the often fundamentally limiting practical problem of how to efficiently search the total data set for the proposed better labeling candidates. Once again referring to the "about-us" web page example, whilst the Active Learning algorithm may be able to generate criteria for the candidate web pages for labeling these must still be sought from the total data set of all web pages. As most practical problems of any utility usually involve extremely large data sets this can seriously reduce the effectiveness of an Active Learning system.

It is an object of the invention to provide an improved machine learning system that reduces the amount of training data required.

SUMMARY OF THE INVENTION

In a first aspect the present invention accordingly provides a method for training a classifier to classify elements of a data set according to a predetermined characteristic, said data set including N elements, said elements each characterised by at least one feature, said method including the steps of:
  forming a first labeled subset of elements from said data set, said elements of said first labeled subset each labeled according to whether said element includes said predetermined characteristic;
  training an algorithmic classifier to classify for said predetermined characteristic according to said first labeled subset thereby determining which at least one feature is relevant to classifying for said predetermined characteristic; and
  querying with said classifier an inverted index, said inverted index formed over said at least one feature and generated from said data set, thereby generating a ranked set of elements from said data set.

Clearly, the ranked set of elements provided by this method will include those elements which incorporate features that the classifier identifies as being relevant to the classification problem. These elements are therefore more likely to provide more positive labeling candidates thereby overcoming a significant problem with prior art methods in those problems where positive labeling candidates are relatively rare in the data set.

Preferably, said method further includes the step of:
  forming a second labeled subset, said second labeled subset including a predetermined number P of elements labeled according to whether each element includes said characteristic, wherein said P elements in said second labeled subset are selected from said ranked set of elements.

Depending on the nature of the classification problem and also the available resources, a predetermined number of the ranked set of elements is selected to form a labeled subset which will incorporate those elements that include the features as identified by the classifier.

Preferably, said method further includes the steps of:
  forming a new labeled subset including said first and second labeled subsets; and
  further training said algorithmic classifier on said new labeled subset.

As the new labeled subset will now contain more relevant examples to train the classifier, the classifier will be able to more easily determine the relative importance of different features for the classification problem under consideration.

Optionally, said method further includes the step of:
forming a second labeled subset, said second labeled subset including a predetermined number P of elements labeled according to whether each element includes said characteristic, wherein said P elements in said second labeled subset includes a first subset of K=α×P elements selected randomly from said N elements of said data set, with number a ranging from 0 to 1, and a second subset of M=(1−α)×P elements selected from said ranked set of elements.

Depending on the classification problem, the classifier may become focussed on a particular set of features. By incorporating a proportion of randomly selected elements the classifier will be provided with examples containing other features which may also be significant to the classification problem.

Preferably, said method further includes the steps of:
weighting each element in said first subset of said second labeled subset with a first weighting parameter $w_\alpha$; and
weighting each element in said second subset of said second labeled subset with a second weighting parameter $w_M$.

Preferably, said first weighting parameter $$w_a = \frac{1}{a}.$$

Preferably, said second weighting parameter $$w_M = \frac{M}{N}.$$

Preferably, said method further includes the steps of:
forming a new labeled subset including said first and second labeled subsets; and
further training said algorithmic classifier on said new labeled subset.

In a second aspect the present invention accordingly provides a method for training a classifier to classify a sequence of elements of a data set according to a predetermined characteristic, said elements characterised by at least one feature, said method including the steps of:
forming a first labeled subset of element sequences by assigning a label to each element in said element sequence indicating whether said element is a member of a sequence of elements in said element sequence that includes said predetermined characteristic;
training an algorithmic classifier to predict the label assigned to each element in said element sequence according to said first labeled subset thereby determining which at least one feature is relevant to classifying whether said element sequence includes said sequence of elements that includes said predetermined characteristic; and
querying with said classifier an inverted index, said inverted index formed over said at least one feature and generated from said data set, thereby generating a ranked set of element sequences from said data set.

A number of important classification problems relate to the classification of element sequences as opposed to a particular element per se. In this manner the present invention may be applied to these problems thereby selecting element sequences that include features which will facilitate the training of the classifier.

Preferably, said classifier further bases its prediction of said label assigned to each element on the label assigned to at least one element prior to said each element in said element sequence.

This improves the classifier's ability to take into account the type of prior elements in the sequence when attempting to label a given element in a sequence.

Preferably, said method further includes the step of assigning a probability associated with each type of label transition for each element in said element sequence thereby determining which at least one feature is relevant to classifying for said each type of label transition and hence a boundary of said sequence of elements within said element sequence that includes said predetermined characteristic.

As often an important requirement in classifying an element sequence is to define the explicit boundaries of that sequence this provides a means to select these element sequences from the data set.

Preferably, said method further includes the step of:
forming a second labeled subset, said second labeled subset including a predetermined number P of element sequences, wherein each element of said P element sequences is labeled according to whether each element is a member of a sequence of elements that includes said predetermined characteristic and wherein said P element sequences are selected from said ranked set of element sequences.

Preferably, said method further includes the steps of:
forming a new labeled subset including said first and second labeled subsets; and
further training said algorithmic classifier on said new labeled subset.

In a third aspect the present invention accordingly provides computer program products including:
a computer usable medium having computer readable program code and computer readable system code embodied on said medium for the classification of elements or a sequence of elements of a data set, said computer program product including computer readable code within said computer usable medium for performing the method steps of any one of the first or second aspects of the invention.

In a fourth aspect the present invention accordingly provides a classification system for classifying elements of a data set according to a predetermined characteristic, said data set including N elements, said elements each characterised by at least one feature, the system including:
a database for storing said elements;
a labeler to label a first labeled subset of elements from said data set, said elements of said first labeled subset each labeled according to whether said element includes said predetermined characteristic;
an algorithmic classifier training to classify for said predetermined characteristic according to said first labeled subset thereby determining which at least one feature is relevant to classifying for said predetermined characteristic;
an indexer to form an inverted index generated from said data elements, said inverted index formed over said at least one feature; and
a ranker to form a ranked set of data elements, wherein said ranked set is formed by querying with said classifier said inverted index.

In a fifth aspect the present invention accordingly provides a classification system for classifying a sequence of elements of a data set according to a predetermined characteristic, said elements characterized by at least one feature, said system including:
- a database for storing said elements;
- a labeler to label a first labeled subset of element sequences by assigning a label to each element in said element sequence indicating whether said element is a member of a sequence of elements in said element sequence that includes said predetermined characteristic;
- an algorithmic classifier trained to predict the label assigned to each element in said element sequence according to said first labeled subset thereby determining which at least one feature is relevant to classifying whether said element sequence includes said sequence of elements that includes said predetermined characteristic;
- an indexer to form an inverted index generated from said data elements, said inverted index formed over said at least one feature; and
- a ranker to form a ranked set of element sequences, wherein said ranked set is formed by querying with said classifier said inverted index.

BRIEF DESCRIPTION OF THE DRAWINGS

Preferred embodiments of the present invention will be discussed with reference to the accompanying drawings wherein.

DETAILED DESCRIPTION OF THE INVENTION

Figure 1:
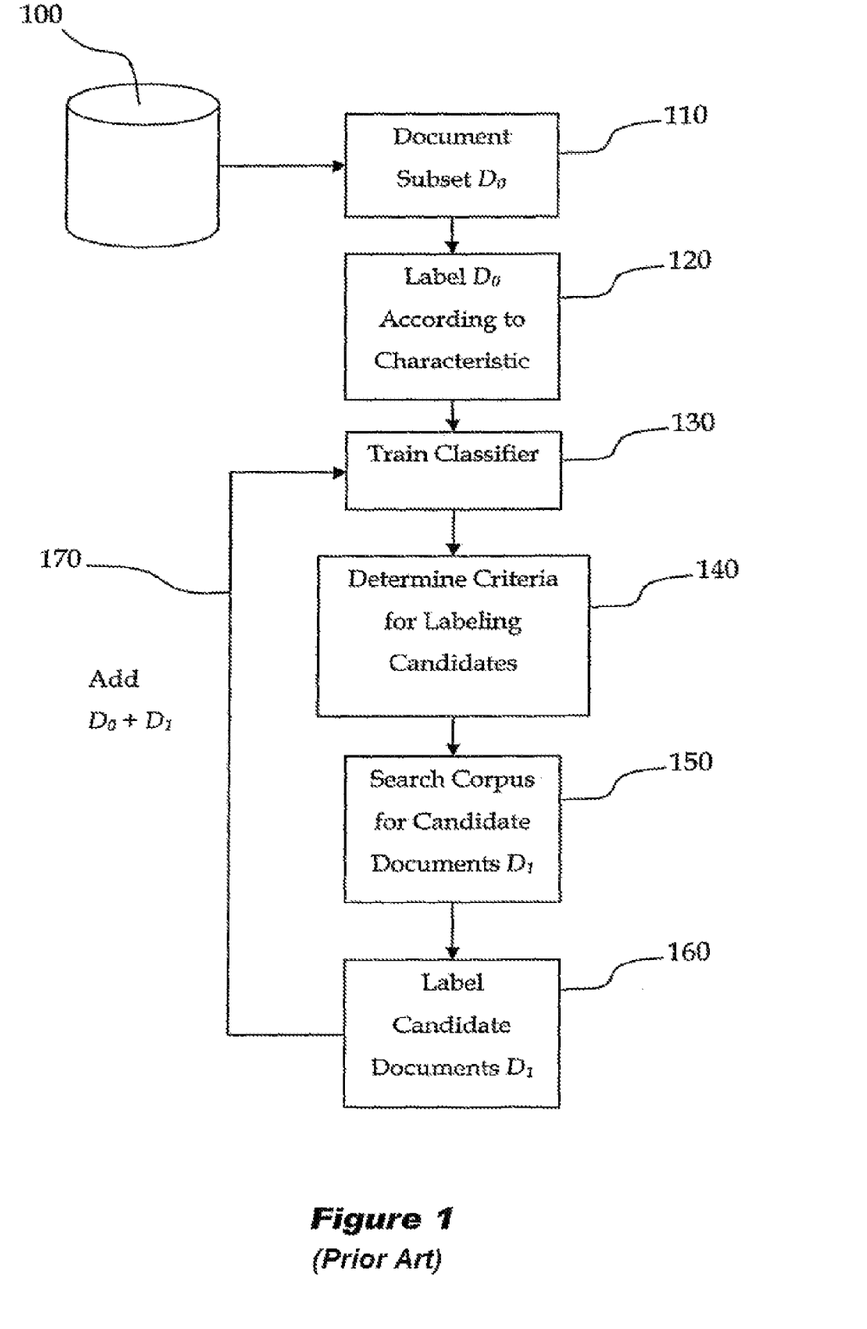
FIG. 1 is a system block diagram of a prior art Active Learning system.

Referring now to FIG. 1, which illustrates a prior art Active Learning system for the classification of documents. Whilst the present invention is described with reference to the classification of documents it will be clear to those skilled in the art that the system described herein is equally applicable to other machine learning applications where elements of a data set must be reliably classified according to a characteristic of that element.

Corpus 100 is a data set consisting of a plurality of text documents such as web pages. In practice each document is represented by a vector $d=[\omega_1, \ldots \omega_N]$ which is an element of the high-dimensional vector-space consisting of all terms. In this representation $w_i$ is non-zero for document d only if the document contains term $t_i$. The numerical value of $w_i$ can be set in a variety of ways, ranging from simply setting it to 1, regardless of the frequency of $t_i$ in d, through to the use of more sophisticated weighting schemes such as tfidf (term frequency inverse document frequency) where each matching term in a document is weighted by its frequency in the document multiplied by the logarithm of the total number of documents in the corpus divided by the number of documents in which the term appears.

The concept of a term can be further generalized to include "derived features" associated with a document such as "this document contains a person name" or the terms on the incoming links to the document. Where a feature representation is used, a document d is represented by its feature-vector such that $d=[f_1, \ldots f_N]$ where $f_{i=}1$, if feature i is contained in document d, and $f_i=0$ otherwise. Unless otherwise specified, it will be assumed that documents will be represented by their equivalent feature vector.

A subset $D_0$ of text documents is selected 110 from corpus 100 and labeled 120 by a person as to whether the document has a predetermined characteristic such as being an "about us" web page. An algorithmic classifier is then trained 130 using the labeled subset $D_0$ as examples to recognize the pre-determined characteristic. In a typical prior art system, a generic linear classifier is employed wherein a weight $w_i$ is generated for each feature $[w_1, w_2, \ldots, w_N]$ (usually most of the $w_i$ are zero) and the score assigned by the classifier c to document d is then given as the sum of the weights of the features in d:

$$c(d) = \sum_{f \in d} w_f \quad (1)$$

To perform classification, a threshold t is chosen and any document d whose score c(d) exceeds t is deemed to belong to the positive class.

The performance of a classifier is typically measured by plotting a precision/recall curve for the classifier as a function of varying the threshold t above which a document is considered to belong to the positive class. The precision of a classifier c at threshold t is the fraction of documents with c(d)>t that are also positive documents. Generally, for a well-trained classifier, precision is an increasing function of the threshold t. The recall of c at threshold t is defined as the fraction of all documents d in the positive class that have c(d)>t. Recall is always a decreasing function of t, so precision and recall are essentially competing requirements as raising the threshold increases precision but lowers recall, and vice versa for lowering the threshold. An optimal classifier has a threshold t yielding "100% precision at 100% recall" so documents with scores above t are guaranteed to be in the positive class, and all positive documents have scores above t. Usually precision and recall are quoted at a particular point, eg "90/75" which indicates 90% precision at 75% recall.

Classifier c(d) can be further generalized to include rule sets defined over the features in a document d. These rule sets are essentially Disjunctive-Normal-Forms (DNF) over the features in a document and are defined by:

$$r:=p_1 V p_2 V \ldots V p_M \quad (2)$$

where each $p_i$ is a distinct conjunction of features (or their negations):

$$p_i:=f_{i1} \wedge \sim f_{i2} \wedge \ldots \wedge f_{iki} \quad (3)$$

Thus a document matches a conjunction if it contains all the required features and none of the prohibited ones and following on from this a document matches a rule if it matches any of the conjunctions in that rule.

A document matching a rule can be given a score by summing a weight associated with each matching conjunction (similar to that specified for each matching feature for the simple feature classifier set out above), in which case the rule can be viewed as a linear classifier over the expanded feature-space containing the rule's conjunctions:

$$c(d) = \sum_{p \in d} w_p \quad (4)$$

where $w_p$ is the weight associated with conjunction p in the rule. As a feature $f_i$ is itself a single conjunction, this formula covers classifiers c that are linear in the features and classifiers that are linear in more general rules. This methodology has applications in codifying decision trees as a Rule Set can be formed consisting of the conjunctions formed by all paths from the root node to the leaves of the decision tree.

Training of the classifier 130, can be accomplished by a number of well known algorithms including Logistic Regression, Support Vector Machines, Maximum Entropy, Decision Tree algorithms, Rule Induction etc. These training algorithms perform two broad functions these being firstly induction of rule sets and secondly estimation of the weights associated with each rule that are most appropriate to determine the characteristic of interest. Algorithms in common use perform each of these functions to a varying degree, from those which concentrate on pure weight estimation (e.g. Logistic Regression, Maximum Entropy) through to those which involve pure rule set induction. However, in general the output of the classifier training algorithm may be viewed in the form as given by equation (4).

Although, the description so far has been in terms of linear classifiers it would be clear to those skilled in the art that these techniques can be applied to what first appear as non-linear classifier schemes. For example, non-linear classifiers can be both non-linear in the parameters w and/or non-linear in the features $f_i$ or rules r. However, in many cases such classifiers can be viewed as linear classifiers in a larger feature-space by adopting a different parameterization. For example, the classifier defined by:

$$c(d)=w_1^2 f_1^2 + w_2^3 f_1 f_2 \quad (5)$$

is non-linear in $w_1$, $w_2$, $f_1$, and $f_2$, but in the instance where the features $f_1$ and $f_2$ are boolean then this "non-linear" classifier is equivalent to the linear classifier $$c(d)=w_3 f_1 + w_4 r_2 \quad (6)$$

where $w_3=w_1^2$, $w_4=w_2^3$ and $r_2=f_1 \wedge f_2$. Even where such a re-paramaterization such as described above is not explicitly possible, a suitable linear approximation to the nonlinear classifier may be made by expanding the feature space or adopting other linearization techniques.

Once the classifier has been trained, criteria are determined 140 for further labeling candidates. Corpus 100 is then searched 150 for label candidates $D_1$ which are then labeled 160, and further incorporated 170 into the training set to train classifier 130. A number of techniques have been developed in prior art systems for choosing candidates for further labeling. Some of these include:
1. choosing the example that the current classifier is most uncertain about or in other words that example to which the classifier most nearly assigns equal scores for both the positive and negative class;
2. choosing the example that will most reduce the size of the "version space" (roughly, the volume of parameter settings consistent with the labeled data);
3. choosing examples according to some information-theoretic criteria; and
4. choosing the example that minimizes the expected error of the classifier.

All of these approaches rely on sequentially searching through the unlabeled examples (or some randomly selected subset thereof) and applying a test to each example to determine its desirability as a new labeling candidate. Often this test is equivalent to inverting a matrix of dimension equal to the total number of unlabeled examples. Clearly, such a sequential search becomes prohibitively expensive when the corpus is very large and the positive class is under-represented.

Figure 2:
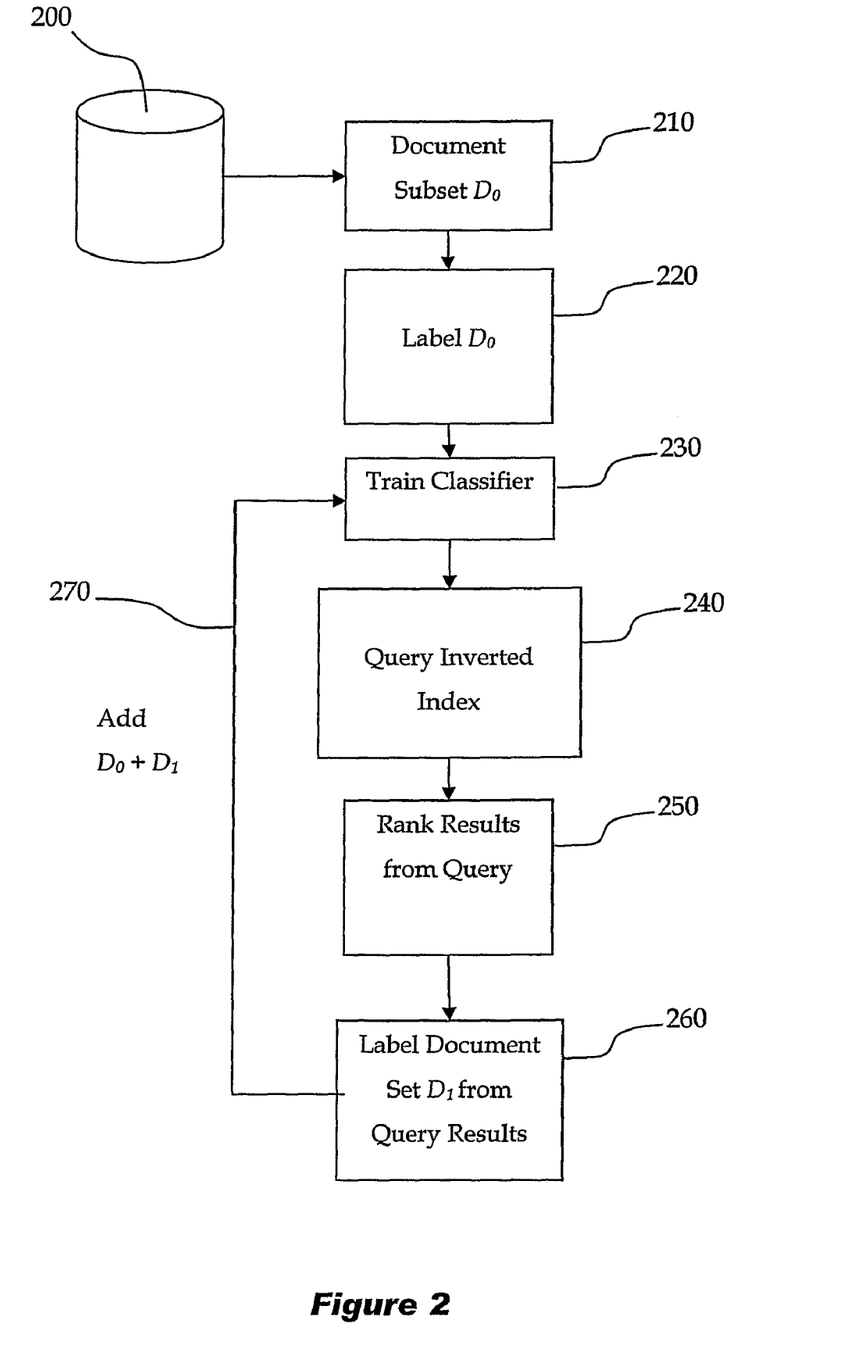
FIG. 2 is a system block diagram of a machine learning system for classification of documents according to a first embodiment of the present invention.

Referring now to FIG. 2, there is illustrated a machine learning system according to a first embodiment of the present invention. Document subset $D_0$ is selected 210 from Corpus 200. $D_0$ is in turn labeled 220 according to the characteristic of interest and a classifier is trained 230 on the initial training subset $D_0$ to classify for this characteristic. The resulting classifier is then used to query an inverted index 240 formed over the relevant features by querying the inverted-index for all documents containing any of the features with non-zero weights in c (including any conjunctions of features as in the examples above), and then summing the classifier weights of the matching features to generate the scores. In this embodiment the documents are returned in descending score order but clearly other alternative ranking schemes can be used, such as returning all documents whose scores are close to the decision threshold t (as the latter group may be more informative in some instances).

The inverted index is generated by forming a table of postings constructed by mapping from features (eg terms, "this document contains a person's name", etc) to the identifiers (usually integers) of the documents containing the relevant feature. In this embodiment the inverted index also stores extra information such as the location of a feature within a document and the frequency of occurrence of feature term within the document. Thus the inverted index includes rows of the form:

feature→<docId, freq, position*>* which allows efficient retrieval of all documents matching Boolean queries over feature and feature combination.

Clearly the use of an inverted index according to the present invention is a methodology that can be generalized to a number of classification problems having a feature-based representation for the data and is not limited merely to the tabulation of document features. As an example the present invention may be extended readily to an image classifier that uses pixel-based features such as either a vector of pixel intensities or features derived from pixels such as Fourier coefficients. Real-valued features can be transformed into Boolean features by binning (i.e. dividing into discrete ranges) and then an inverted index built with the binned features.

Results are then ranked 250 from the inverted index query. As would be apparent to those skilled in the art the results can be ranked according to a formula that depends on the number of features in the document matching the query, the frequency and proximity of features within the document such as tfidf or alternatively incorporate a separate "boost" (weight) associated with the features in the query. A number of documents are then selected or chosen from the ranked results and labeled 260 thereby forming further training document subset $D_1$ which is added to initial set $D_0$ 270 and the classifier is then trained 230 on this new example set.

Figure 3:
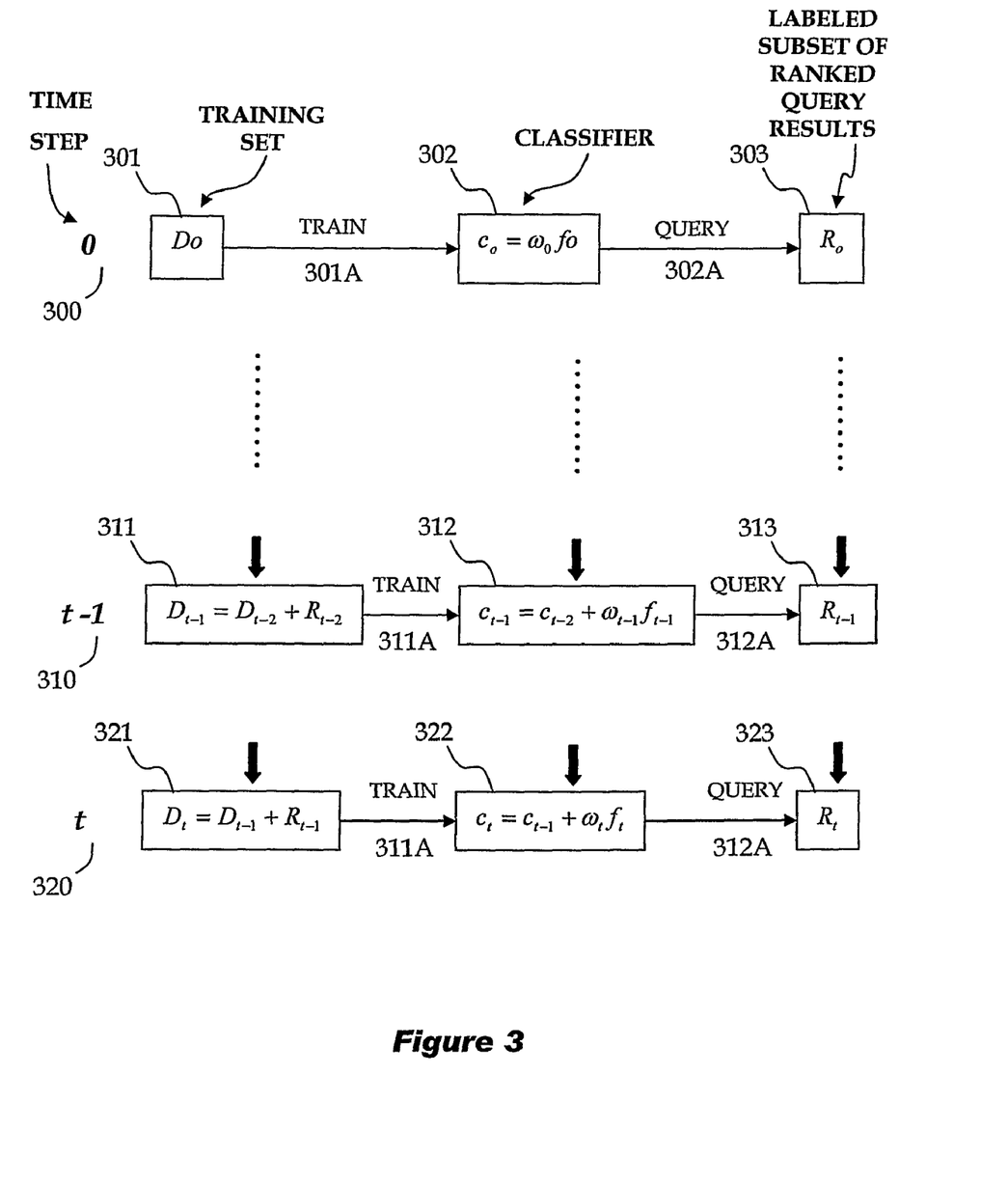
FIG. 3 is a system block diagram describing in detail the machine learning system illustrated in FIG. 2.

Referring now to FIG. 3, there is illustrated in further detail the steps for training the classifier. At initial time step 300, start with small set of labeled data $D_0$ 301 that includes at least one positive and one negative example of this characteristic. This data may be generated by randomly labeling a small set of documents, or alternatively by constructing queries by hand to retrieve likely candidates. Initial classifier $c_0$ is trained 302 on $D_0$ 301 and the resulting classifier used to perform a ranked retrieval 302A from the inverted index. Any training algorithm for linear classifiers can be used (Logistic Regression, SVMs, Maximum Entropy, etc), but best performance will generally be obtained by "pruning" the classifier at this early stage to contain as few features (or conjunctions thereof) with non-zero weights as possible. A subset of these documents Ro is then chosen and labeled 303.

Generalizing to time step t 320, a linear classifier $c_t$ 322 is trained to fit data $D_t$ 321 which is formed from training data $D_{t-1}$ 311 at time step t−1 310 and labeled documents $R_{t-1}$ 313. Classifier $c_t$ is formed from the classifier $c_{t-1}$ from the previous time-step and new features $w_t f_t$ with a weight $w_t$ generated to minimize the error of $c_t$ on the new training set $D_t$. As would be appreciated by those skilled in the art, several rounds of training could be performed at each time step generating a series of features $f_1, \ldots f_k$, each minimizing some error which are then added to the existing classifier $C_{t-1} + \Sigma_{i=1}^k w_i f_i$ for each time step t.

Trained classifier $c_t$ is then used to query 322A the inverted index and present the ranked documents for labeling 323. In the simplest case, documents can be ranked in descending order of the scores assigned by $c_t$, but as already herein described other methods such as focusing on a particular region of scores assigned by $c_t$ are also possible. After the human labeling of a portion of the ranked hits, the existing training data set is augmented to generate $D_{t+1} = D_t + R_t$.

During early stages of the training algorithm, the classifiers $c_t$ may be quite poor (and hence the documents retrieved from the index may contain few positive examples), one could also augment the training data by querying the index with some of the documents in the training data, and labeling the highest scoring matches according to a generic scoring scheme such as tfidf.

Considering again the concrete example of training a classifier for classifying "about us" web pages. Suppose initially that $D_0$ contains a handful of positive and negative examples, and the computer chooses "about" as the first feature in step 302, so $c_0 = w_{about} f_{about}$. The inverted index is then queried 302A with $c_0$, returning at the top of the list all documents containing the word "about". Many of the returned hits will not be "about us" pages, but there will be a far higher proportion of "about-us pages" in the returned hits than in the underlying corpus. Furthermore, the labeled data 303 provides the right kind of information for the machine learning algorithm to improve performance with respect to the existing classifier $c_0$ i.e. examples of documents with "about" that are "about us" pages and examples of documents with "about" that are not about-us pages. Since $c_0$ is essentially the classifier that claims every document containing the word "about" is an about-us page, the negative examples in particular are showing the classifier where that assumption fails.

With the new data $D_1$, a new classifier $c_1$ is constructed at the next time step, which will contain features that refine the initial simple guess. As the process proceeds, the classifier is incrementally constructed to try and cover as many positive examples as possible, whilst effectively validating at the labeling step the latest "assumptions" made by the machine learning algorithm at the previous training step.

Figure 4:
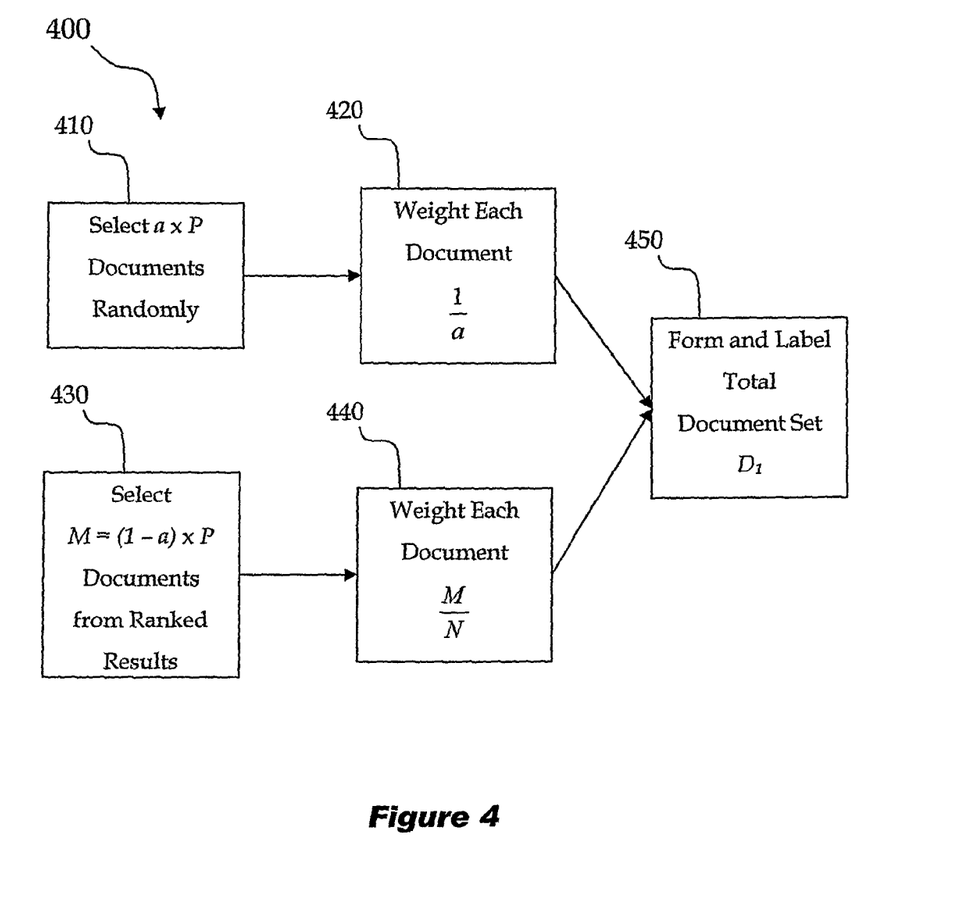
FIG. 4 is a system block diagram of a modified document selection method for classifier training according to a second embodiment of the present invention.

Referring now to FIG. 4, there is illustrated a modified method 400 for selecting and reweighting documents to be labeled on each iteration of classifier training according to a further embodiment of the present invention. Modified method 400 essentially replaces steps 240 and 250 as depicted in FIG. 2. As the documents generated by performing a pure ranked retrieval query of an inverted index are necessarily different from those that would be selected by pure random selection it may in some instances be necessary to compensate for this in the document selection process. A test for when a modified selection method is required may be undertaken by generating a new random labeled sample after some number of iterations of the unmodified method and then testing the performance of the classifier on this random sample. If the classifier performs significantly worse than what would be expected based on the results from the actively selected examples, it is a sign that the procedure has become stuck and the modified selection method should be applied.

Modified selection method 400 essentially replaces step 260 as originally referred to in FIG. 2. Assuming P documents are to be labeled for classifier training, a first set corresponding to $K = \alpha \times P$ documents is randomly selected 410 from corpus 100. The number P will be dependent on the type of problem, the resources available for labeling and in some applications the computing power available. In practice α will be a small value such as 0.1 but this can be modified according to the classification problem. Each document selected is then weighted 420 by weighting parameter $$w_a = \frac{1}{a}.$$

A remaining set of $M = (1-\alpha) \times P$ documents is selected 430 from the ranked retrieval query results in a similar manner to that already described previously with reference to FIGS. 2 and 3. Each document in this set is weighted 440 by weighting parameter $$w_M = \frac{M}{N}$$

where N is the total number of documents in corpus 100. Total document set $D_1$ is then formed 450 by adding these two subsets and subsequently labeled for classifier training.

To understand the justification for this selection and reweighting method consider that the machine learning system according to the first embodiment of the present invention does not generate samples uniformly at random because it is deliberately attempting to focus on the under represented positive class. Defining $\chi_i$ to represent each of the documents selected for classifier training and $f(\chi_i)$ as the error of the classifier for each $\chi_i$ then the expectation $E_X f(X)$ of error function f of the random variable X corresponding to the entire corpus of documents would be generated by sampling from the distribution of X, that is by selecting $\chi_1, \ldots, \chi_n$, and then estimating $1/n \ \Sigma_{i=1}^n f(\chi_i)$ In the limit of large n, the estimate converges to the true expectation and hence a true measure of performance of the classifier over the corpus.

However, if f is almost always zero (or constant), with a few "rare events" where it differs from zero the empirical estimate can be very slow to converge to the true expectation which is the case for classification problems where the positive examples are seriously under represented. As a consequence of using documents which result from a ranked retrieval of an inverted index instead of using the uniform distribution $p(\chi)$ to sample from X, a non-uniform distribution $q(\chi)$ which is more heavily weighted towards the interesting documents is employed. Thus the estimate $$\frac{1}{n}\sum_{i=1}^{n} f(x_i)$$

does not converge to $E_X f(X)$ but instead to $\Sigma_\chi f(\chi)q(\chi)$ reflecting the underlying skewing due to the specialized selection of documents. However, if each example is reweighted by weighting parameter $$\frac{p(x)}{q(x)}$$

then the expectation becomes $$\frac{1}{n}\sum_{i=1}^{n} f(x_i)\frac{p(x_i)}{q(x_i)},$$

and in the limit the true expectation is recovered:

$$E_X f(x) = \sum_x f(x)p(x) = \sum_x f(x)q(x)\frac{p(x)}{q(x)}.$$

Therefore to compensate for this effect the documents used to train the classifier are replaced with a reweighted version in which each example $\chi_i$ is weighted by weighting parameter $p(\chi_i)/q(\chi_i)$. Clearly, if a sample $\chi$ has $q(\chi)=0$ when $p(\chi)\neq 0$ and $f(\chi)\neq 0$ then in that case the scheme fails because $$f(x)\frac{p(x)}{q(x)} = \infty.$$

More generally, samples $\chi$ with small $q(\chi)$, large $f(\chi)$, and non-zero $p(\chi)$ should be avoided because they will contribute a large amount to the empirical estimate and hence will increase its variance (exactly the effect that should be avoided).

For the classifier training case, the distribution $q(\chi)$ over examples is $1/M$ for the M examples presented to the human labeler and 0 for all other examples. The examples presented to the human for labeling are determined by the classifier $c_t$ trained at the last step, hence $q(\chi)$ can change each round of training. The examples $\chi$ with small $q(\chi)$, large $f(\chi)$, and non-zero $p(\chi)$ on each round are those that do not have a good match with the classifier $c_t$ and hence should be added to the training data, yet do not turn up high on the query results list. Thus the problem examples are those misclassified documents that do not turn up high on the query results list.

This is addressed by ensuring that $q(\chi)$ has some minimum lower bound. This is done by sampling a certain portion of the documents for training the classifier at random so that a new sampling distribution $r(\chi)$ defined by $r(\chi)=\alpha p(\chi)+(1-\alpha)q(\chi)$ where a is some small number like 0.1.

Effectively this amounts to choosing 90% of documents to label from the query results (step 430) and the remaining 10% of the documents being chosen uniformly at random (step 410).

As a consequence, the weighting parameter $$\frac{p(x)}{r(x)}$$

for those documents obtained from the inverted index is (assuming N is large with respect to M, and furthermore that $\alpha$ is small)

$$\frac{p(x)}{r(x)} \approx \frac{M}{N}$$

(corresponding to reweighting step 440) and for uniformly chosen document $\chi$, $$\frac{p(x)}{r(x)} = \frac{1}{a}$$

(corresponding to reweighting step 420).

It will be clear to those persons skilled in the art that the present random selection and reweighting scheme could be generalised to cover arbitrary reweighting mechanisms that utilise the inverted index and the currently trained classifier.

Clearly, the machine learning system for classifying documents as described herein will reduce the labeling burden and hence significantly decrease training time for any Machine Learning problem with a large training set and a small positive class.

Although the present discussion has concentrated on applications of the present invention to standard classification problems the invention may also be applied to related problems such as extraction, where the entity to be extracted can be categorized as a predetermined sequence of elements from a data set. Some examples of data extraction include speech recognition, gene searching and information extraction from a document. Extraction can be broadly defined as segmentation, where a data set is first segmented into relevant segments, plus classification where these segments are then classified. An illustrative example taken from the field of information extraction from a document is to not only determine whether a sequence of words within the document corresponds to an entity such as a person's name but also the boundaries of this entity so that this information can be extracted from the document.

One approach to extraction problems is to effectively treat them as a succession of individual classification problems thereby allowing the present invention to be also applied to improving the extraction of entities corresponding to a predetermined sequence of elements from a data set. Such an approach is used in the Maximum Entropy Markov Model or MEMM algorithm. In one illustrative embodiment related to the extraction of text based entities from a document, features are associated with each word in the sequence to be extracted. These features would range from a property of the word itself-such as the type and degree of capitalization (e.g. lead_cap, all_cap, camel_case, etc) to membership of a predetermined list (e.g. list_first_name, list_honorific, dict_word).

Representative examples of names in text would be labeled with PERSON NAME or OTHER (additional name components could be included including FIRST NAME, LAST NAME, MIDDLE NAME, MAIDEN NAME, SUFFIX, etc).

In the simplest application of the MEMM algorithm, a classifier is trained to predict the label assigned to each word in the training sequences as a function of the features associated with the given word and the label assigned to the previous word. By including the label assigned to the previous word into the classifier's prediction the sequential dependence of the labels assigned to each word and hence the structure of the word sequence is included in the classifier model. A higher order classifier model would also introduce further dependence on last-but-one label, etc.

Once these classifiers are trained, they can be used to perform extraction by assigning a probability to each label transition on each word in a sequence. With two labels (PERSON NAME, OTHER) there are 4 possible label-transitions. The label-transition probabilities can be obtained from the raw numbers generated by the classifier for each word in a number of ways, most commonly by exponentiation and normalization. Once the 4 label-transition probabilities have been assigned to each word, the probability of a specific assignment of labels to the entire word sequence may be computed by multiplying the probability of each label-transition in the assignment. The most likely label sequence may be computed using standard algorithms such as Viterbi or approximate methods such as Viterbi beam-search.

The final step in processing is to take the label sequence and use it to determine the person names by identifying appropriate subsequences of labels (such as OTHER PERSON_NAME OTHER);

As an illustrative example consider identifying the sequence "Dr Jonathan Baxter" as being a sequence of words that corresponds to a person's entire name from within the text " . . . a native of Adelaide, Dr Jonathan Baxter is the CEO of Panscient Pty Ltd. . . . ".

In this example, the set of features associated with each word might be:

[a], [native], [of],
[adelaide: lead_cap, list_city, list_city_australia],
[,: list_punctuation],
[dr: lead_cap, list_honorific],
[jonathan: lead_cap, list_firstname],
[baxter: lead_cap, list_lastname],
[is], [the],
[ceo: all_cap, list_jobtitle],
[of],
[panscient: lead_cap, non_dict_word],
[pty: lead_cap, list_company],
[ltd: lead_cap, list_company]),
where the italicised terms in square brackets represent the features of each individual word.

Using training data of this form, four classifiers are trained, one for each of the possible label transitions:
OTHER→OTHER,
OTHER→PERSON_NAME,
PERSON_NAME→OTHER,
PERSON_NAME→PERSON_NAME,
Each of these classifiers will have its own corresponding linear combination of the features.

These classifiers are then trained on the labeled data. In this example it is likely that after training the OTHER→PERSON NAME classifier would result in large positive weights assigned to the lead_cap and list_first_name features, and additionally the list_last_name feature to account for a word sequence like "Baxter, Jonathan".

Consecutive sequences of words with PERSON_NAME labels are then the extracted person's name. Because Viterbi decoding is extracting the optimal sequence of label transitions, it will account for long-range dependencies in the data to distinguish, for example, a person's name from a company name. As an example the following word sequence "Jonathan Baxter Pty Ltd" (i.e. labeled as [OTHER, OTHER, OTHER, OTHER] should be treated as a company name whereas the the word sequence "Jonathan Baxter is the" (i.e. labeled as [PERSON_NAME, PERSON_NAME, OTHER, OTHER] should be extracted as a person's name.

Clearly, in order to recognize these differences the labeled data will need to contain examples of company names which include first name and last name combinations, and also the relevant features to recognize a company qualifier such as "Pty" or "Ltd". In this example the classifier will have learnt from the labeled data that a transition from PERSON_NAME→OTHER is much less likely than a transition from OTHER→OTHER when the current word includes the company qualifier feature (i.e. it is a member of list_company). Thus the weight attached to that feature for the classifier predicting the PERSON_NAME→OTHER transition would be large and negative. This low transition probability will propagate through the whole sequence by virtue of the Viterbi decoding thereby yielding an overall low probability for "Jonathan Baxter" being a person's name when it is followed by the company qualifiers "Pty Ltd". As can be appreciated from this example, the relevant non-trivial label transition classifiers may place a high weight on a relatively infrequently occurring feature, such as the list_first_name feature having a high weight for the OTHER→PERSON NAME transition.

Figure 5:
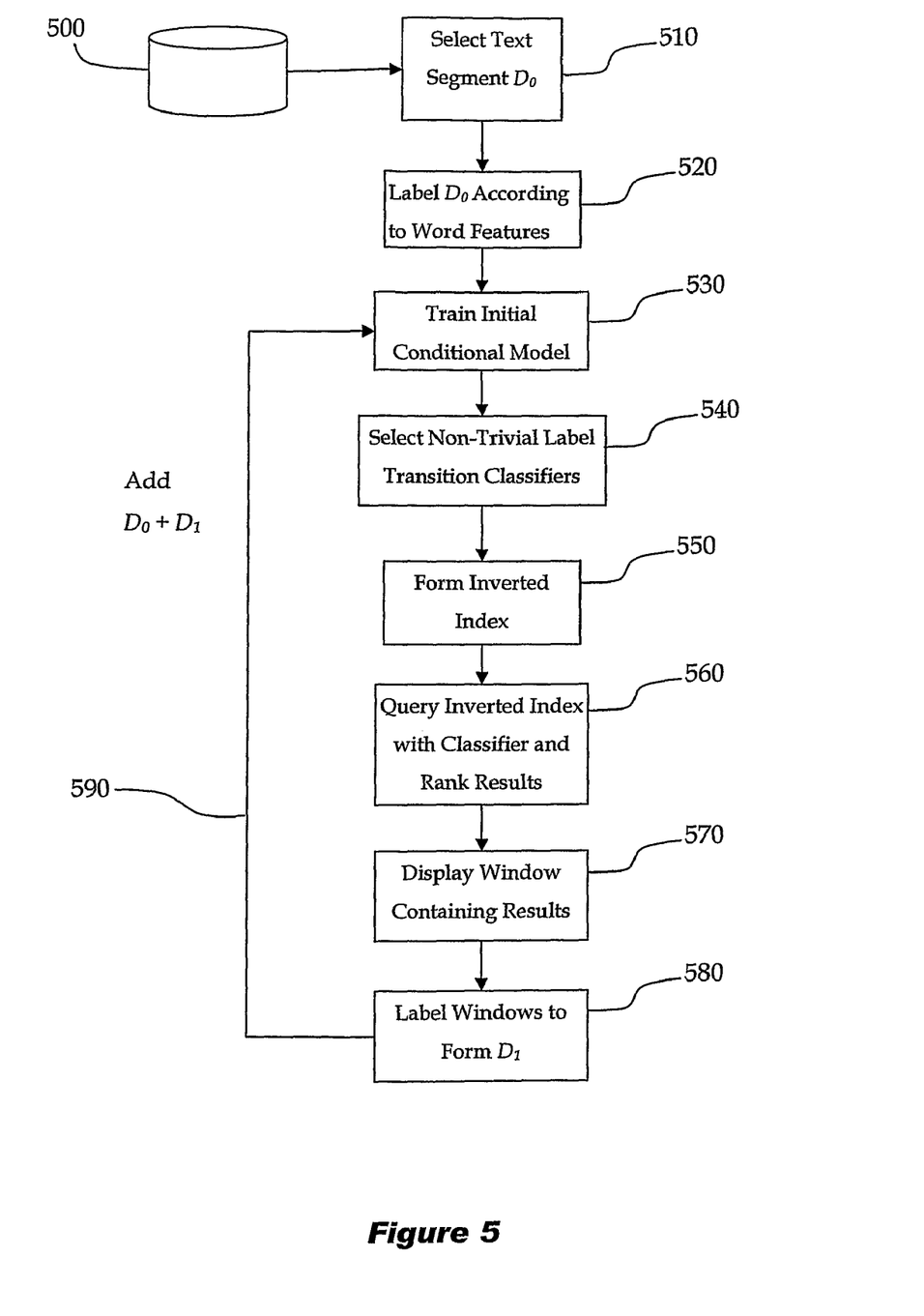
FIG. 5 is a system block diagram of a machine learning system for text extraction according to a third embodiment of the present invention.

Referring now to FIG. 5, there is shown an application of the present invention to the extraction of text based entities from a document. An initial text segment $D_0$ is selected 510 from corpus 500 and labeled 520 according to selected features that are appropriate for the extraction task. In the example of the extracted text entity being a person's name, clearly features such as being a member of known first and last names would be relevant. In addition, features that are relevant for distinguishing a person's name from a word sequence which may be confusingly similar are incorporated. In the example described above, a feature such as company name qualifier would fall into this category.

An initial conditional model is trained 530 which may include a number of individual label transition classifiers. The non-trivial label transition classifiers relevant to the extraction problem at hand (e.g. NOT OTHER→OTHER) are selected 540 and an inverted index is formed 550 over those features which are seen to be relevant to the selected label transition classifiers. In practice an inverted index will be formed initially over all features used in the classification exercise, as the generation of the index is a computationally intensive exercise for any corpus that would be relevant to an extraction problem likely to be of interest.

The inverted index is directly queried 560 by the relevant label transition classifiers and the resulting text sequences from the query ranked. These text sequences will include those high-weight, but otherwise low frequency features, which would normally require using extremely large text segments to obtain. In this text extraction example, windows including the ranked text sequences are displayed 570 to the human classifier allowing them to be labeled 580 according to whether they contain the text entity to be extracted to form an additional training data set $D_1$ and added 590 to the initial training subset $D_0$ and the initial conditional models retrained on this expanded data set.

Figure 6:
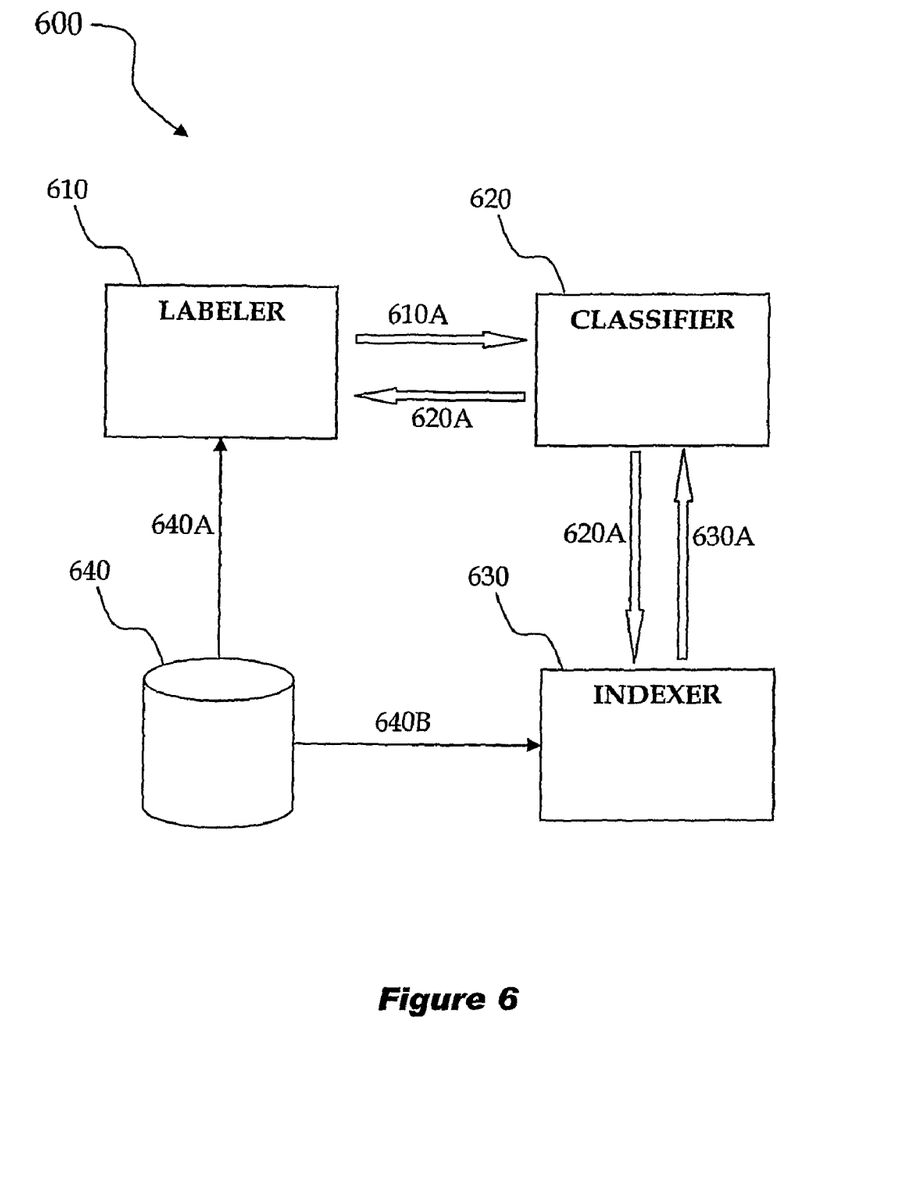
FIG. 6 is a system component view of machine learning system embodying the present invention.

Referring now to FIG. 6, there is shown a system component view of a machine learning system 600 embodying the present invention. Machine learning system 600 includes a labeler 610 which labels data elements according to whether a data element has a given characteristic. Data elements for labeling are sourced 640A from database 640 which contains the entire data set of interest. Labeled elements then form input 610A to classifier 620 which in the process of attempting to analyse the labeled elements will determine features of each element that are pertinent to whether the element can be classified as having a given characteristic or not.

This feature information then forms input information 620A to indexer 630 which forms an inverted index based on these features over the data set again sourced 640B from database 640. This index information is used 630A by the classifier 620 to generate a set of data elements that are likely to be relevant for classification. Accordingly, this generated set is provided 620A to the labeller who then labels this and incorporates it with the first set of labeled elements for the classifier 620 training.

As would be apparent to those skilled in the art this approach may be readily applied to other extraction problems which are designed to extract a predetermined sequence of individual elements from a data set.

As is well known, annotating data for training speech recognizers is an arduous, specialized, and time-consuming process. In one application relevant to the problem of speech recognition, the individual elements would be fixed windows of speech data and the features would include measured parameters such as binned mel-cepstral coefficients. Many different types of labeling could be applied, depending on the training problem, but most common is the assignment of phoneme labels. An inverted index would be constructed mapping binned mel-cepstral coefficients to their locations in the speech data, and used to train a conditional extractor over those features with one label for each phoneme. Under this procedure only a subset of the corpus would require initial labeling, and then the feedback between the trained extractor and the inverted index would target labeling at the most informative portion of the corpus. This would represent substantial savings over current approaches that require pre-annotation of the entire corpus.

In another example relevant to gene searching the elements are individual base-pairs and the features may include the base-pair identity itself, an indicator of which amino acid (base-pair triple) the pair is contained within, features indicating that the base is part of a repeated sequence of base pairs, distance of the pair from the start of any repeat, etc. An inverted index would be constructed mapping these features to their locations in the DNA corpus. Labeling in this case would involve assigning a gene marker to those known DNA positions that express a gene. A conditional extractor over the features predicting gene locations would then be trained from the initial data, and used to predict alternative gene sites in the DNA sequence. The alternative sites could be examined by a human expert or subject to further experimentation to determine whether they correspond to genes, and the results fed back into the extractor training process.

Although a number of embodiments of the present invention have been described in the foregoing detailed description, it will be understood that the invention is not limited to the embodiments disclosed, but is capable of numerous rearrangements, modifications and substitutions without departing from the scope of the invention as set forth and defined by the following claims.

What is claimed:

1. A method for training a classifier to classify elements of a data set according to a predetermined characteristic, said data set including N elements, said elements each characterized by at least one feature, said method comprising:

forming a first labeled subset of elements from said data set, said elements of said first labeled subset each labeled according to whether said element includes said predetermined characteristic;

training an algorithmic classifier to classify for said predetermined characteristic according to said first labeled subset thereby determining which at least one feature is relevant to classifying for said predetermined characteristic; and querying with said classifier an inverted index, said inverted index formed over said at least one feature and generated from said data set, thereby generating a ranked set of elements from said data set, wherein said method further comprises:

forming a second labeled subset, said second labeled subset including a predetermined number P of elements labeled according to whether each element includes said characteristic, wherein said P elements in said second labeled subset includes a first subset of $K=\alpha \times P$ elements selected randomly from said N elements of said data set, with number $\alpha$ ranging from 0 to 1, and a second subset of $M=(1-\alpha) \times P$ elements selected from said ranked set of elements.

2. A method for training a classifier according to claim 1, wherein said method further comprises:

weighting each element in said first subset of said second labeled subset with a first weighting parameter $\omega_\alpha$; and weighting each element in said second subset of said second labeled subset with a second weighting parameter $\omega_M$.

3. A method for training a classifier according to claim 2, wherein said first weighting parameter $\omega_\alpha=1/\alpha$.

4. A method for training a classifier according to claim 2, wherein said second weighting parameter $\omega_M=M/N$.

5. A method for training a classifier according to claim 1, wherein said method further comprises:

forming a new labeled subset including said first and second labeled subsets; and further training said algorithmic classifier on said new labeled subset.

6. A method for training a classifier to classify a sequence of elements of a data set according to a predetermined characteristic, said elements characterized by at least one feature, said method comprises:

forming a first labeled subset of element sequences by assigning a label to each element in said element sequence indicating whether said element is a member of a sequence of elements in said element sequence that includes said predetermined characteristic;

training an algorithmic classifier to predict the label assigned to each element in said element sequence according to said first labeled subset thereby determining which at least one feature is relevant to classifying whether said element sequence includes said sequence of elements that includes said predetermined characteristic; and querying with said classifier an inverted index, said inverted index formed over said at least one feature and generated from said data set, thereby generating a ranked set of element sequences from said data set, wherein said classifier further bases its prediction of said label assigned to each element on the label assigned to at least one element prior to said each element in said element sequence.

7. A method for training a classifier to classify a sequence of elements of a data set according to claim 6, further comprising assigning a probability associated with each type of label transition for each element in said element sequence thereby determining which at least one feature is relevant to classifying for said each type of label transition and hence a boundary of said sequence of elements within said element sequence that includes aid predetermined characteristic.

8. A method for training a classifier according to claim 6, wherein said method further comprises:
forming a second labeled subset, said second labeled subset including a predetermined number P of element sequences, wherein each element of said P element sequences is labeled according to whether each element is a member of a sequence of elements that includes said predetermined characteristic and wherein said P element sequences are selected from said ranked set of element sequences.

9. A method for training a classifier according to claim 8, wherein said method further comprises:
forming a new labeled subset including said first and second labeled subsets; and further training said algorithmic classifier on said new labeled subset.

10. A classification system for classifying elements of a data set according to a predetermined characteristic, said data set including N elements, said elements each characterized by at least one feature, the system comprising:
a database for storing said elements;
a labeler to label a first labeled subset of elements from said data set, said elements of said first labeled subset each labeled according to whether said element includes said predetermined characteristic;
an algorithmic classifier training to classify for said predetermined characteristic according to said first labeled subset thereby determining which at least one feature is relevant to classifying for said predetermined characteristic;
an indexer to form an inverted index generated from said data elements said inverted index formed over said at least one feature; and
a ranker to form a ranked set of data elements, wherein said ranked set is formed by querying with said classifier said inverted index,
wherein said system further comprises:
said labeler forming a second labeled subset, said second labeled subset including a predetermined number P of elements labeled according to whether each element includes said characteristic, wherein said P elements in said second labeled subset includes a first subset of $K=\alpha \times P$ elements selected randomly from said N elements of said data set, with number a ranging from 0 to 1, and a second subset of $M=(1-\alpha) \times P$ elements selected from said ranked set of elements.

11. A classification system for classifying elements of a data set according to claim 10, wherein said system further comprises:
weighting each element in said first subset of said second labeled subset with a first weighting parameter $\omega_\alpha$; and
weighting each element in said second subset of said second labeled subset with a second weighting parameter $\omega_M$.

12. A classification system for classifying elements of a data set according to claim 11, wherein said first weighting parameter $\omega\alpha=1/\alpha$.

13. A classification system for classifying elements of a data set according to claim 11, wherein said second weighting parameter $\omega_{\alpha M}=M/N$.

14. A classification system for classifying elements of a data set according to claim 10, wherein said system further comprises:
said labeler forming a new labeled subset including said first and second labeled subsets; and
said algorithmic classifier training on said new labeled subset.

15. A classification system for classifying a sequence of elements of a data set according to a predetermined characteristic, said elements characterized by at least one feature, said system comprising:
a database for storing said elements;
a labeler to label a first labeled subset of element sequences by assigning a label to each element in said element sequence indicating whether said element is a member of a sequence of elements in said element sequence that includes said predetermined characteristic;
an algorithmic classifier trained to predict the label assigned to each element in said element sequence according to said first labeled subset thereby determining which at least one feature is relevant to classifying whether said element sequence includes said sequence of elements that includes said predetermined characteristic;
an indexer to form an inverted index generated from said data elements, said inverted index formed over said at least one feature; and
a ranker to form a ranked set of element sequences, wherein said ranked set is formed by querying with said classifier said inverted index,
wherein said classifier further bases its prediction of said label assigned to each element on the label assigned to at least one element prior to said each element in said element sequence.

16. A classification system for classifying a sequence of elements of a data set according to claim 15, further comprising assigning a probability associated with each type of label transition for each element in said element sequence thereby determining which at least one feature is relevant to classifying for said each type of label transition by said classifier and hence a boundary of said sequence of elements within said element sequence that comprises said predetermined characteristic.

17. A classification system for classifying a sequence of elements of a data set according to claim 15, wherein said system further comprises:
said labeler forming a second labeled subset, said second labeled subset including a predetermined number P of element sequences, wherein each element of said P element sequences is labeled according to whether each element is a member of a sequence of elements that includes said predetermined characteristic and wherein said P element sequences are selected from said ranked set of element sequences.

18. A classification system for classifying a sequence of elements of a data set according to claim 17, wherein said system further comprises:
said labeler forming a new labeled subset including said first and second labeled subsets; and said algorithmic classifier training on said new labeled subset.

* * * * *